United States Patent [19]

Marans et al.

[11] 4,403,083

[45] Sep. 6, 1983

[54] PREPARATION OF SOLID POLYURETHANE PARTICLES

[75] Inventors: Nelson S. Marans; Clifton L. Kehr, both of Silver Spring, Md.

[73] Assignee: W. R. Grace & Co., New York, N.Y.

[21] Appl. No.: 413,294

[22] Filed: Aug. 31, 1982

Related U.S. Application Data

[63] Continuation-in-part of Ser. No. 44,808, Jun. 1, 1979, abandoned.

[51] Int. Cl.$^3$ .................... C08G 18/48; C08G 18/10
[52] U.S. Cl. ........................ 528/44; 528/76; 528/904
[58] Field of Search ............ 528/76, 904, 44

[56] References Cited

U.S. PATENT DOCUMENTS

| | | | |
|---|---|---|---|
| 3,402,149 | 9/1968 | Walters | 260/75 |
| 3,655,627 | 4/1972 | Hutzler | 260/77.5 |
| 3,822,238 | 7/1974 | Blair et al. | 260/75 |
| 3,850,880 | 11/1974 | Hakanson et al. | 260/75 |
| 3,953,406 | 4/1976 | Marsh | 528/904 |
| 4,137,200 | 1/1979 | Wood et al. | 521/159 |
| 4,209,605 | 6/1980 | Hoy et al. | 528/54 |

*Primary Examiner*—H. S. Cockeram
*Attorney, Agent, or Firm*—Richard P. Plunkett; William W. McDowell, Jr.

[57] ABSTRACT

This invention relates to novel hydrophilic, crosslinked, polyurea-urethane, solid, discrete particles formed by adding in droplet form a hydrophilic prepolymer comprising an isocyanate-capped polyol or mixtures thereof wherein said polyol or mixture of polyols has a reaction functionality greater than two, the total of said polyol present having an ethylene oxide content of at least 40 weight percent, before capping to a large excess of a stirred aqueous reactant. The resultant solid particles can be molded into various shapes as desired or used for coating or adhesive applications.

3 Claims, No Drawings

PREPARATION OF SOLID POLYURETHANE PARTICLES

This application is a continuation-in-part of copending application having Ser. No. 44,808, filed June 1, 1979, now abandoned.

BACKGROUND OF THE INVENTION

This invention relates to new hydrophilic, crosslinked, polyurea-urethane, solid, discrete particles and to a method for their preparation. More particularly, the present invention relates to hydrophilic solid particles prepared by a process consisting of adding in droplet form
  (a) a hydrophilic prepolymer comprising an isocyanate-capped polyol or mixtures thereof wherein said polyol or mixture of polyols has a reaction functionality greater than two, the total of said polyol present having an ethylene oxide content of at least 40 weight percent, before capping to
  (b) an agitated water reactant, the volume ratio of (b):(a) being at least 2:1 and thereafter recovering the thus formed polyurea-urethane particles therefrom.

Solid polyurethane particles are known in the prior art. See Hutzler, U.S. Pat. No. 3,655,627, and Walters, U.S. Pat. No. 3,402,149. However, the teaching of both Walters and Hutzler is of a hydrophobic prepolymer in an emulsified system by use of surfactants to obtain an emulsion. The dispersion into hydrophobic particles is thus created by emulsifiers.

Wood, U.S. Pat. No. 4,137,200, teaches a method of forming a hydrophilic polyurethane foam. There is no teaching in Wood for forming solid hydrophilic polyurethane particles.

Numerous attempts have been made in the prior art to produce hydrophilic polyurethane particles. Typical methods of forming polymeric particles have been described in the literature. Solution, suspension and emulsion polymerization have been used to form particles of the desired size. Techniques for such preparations are described in The Encyclopedia of Polymer Science and Technology, 1972, John Wiley & Sons, Inc., under the topics *Suspension Polymerization* at pg. 552 of Vol. 13 and *Ion Exchange Polymers—Synthesis and Characteristics* at pg. 700 of Vol. 7. Polymeric powders have also been formed by mechanical working or solution methods as described in the same text under *Powder Coatings* at pg. 544, Vol. 1, of the 1976 Supplement. The particles can be formed by pelletizing, granulating, spray-drying or chemical precipitation.

The formation of polymer particles in situ by the reaction of isocyanate-capped prepolymer being added in droplet form to an aqueous medium without the use of emulsifiers has not apparently been used before to prepare particles that are suitable for molding, coating, adhesive and other applications.

DESCRIPTION OF THE INVENTION

It has now been surprisingly found, however, that improved new hydrophilic crosslinked polyurethane solid, discrete particles may be prepared simply by adding in droplet form
  (a) a hydrophilic prepolymer comprising an isocyanate-capped polyol or mixtures thereof wherein said polyol or mixture of polyols has a reaction functionality greater than two, the total of said polyol present having an ethylene oxide content of at least 40 weight percent, before capping to
  (b) an agitated water reactant, the volume ratio of (b):(a) being at least 2:1 and thereafter recovering the thus formed hydrophilic, crosslinked, solid, discrete polyurea-urethane particles therefrom.

The thus generated solid, discrete particles are typically characterized by having a crosslinked, i.e., non-linear, molecular network, which provides the solid particle product with a broad spectrum of improved properties.

Various combinations of (a) with (b) supra are operable to form particles by the present invention. One example to form (a) supra would be to cap a polyoxyethylene containing diol with a diisocyanate such that the capped product had a reaction functionality of 2. Since this material, per se, will not yield a crosslinked particle but only chain-extend, it is necessary to add thereto either
  (1) a diol capped with a polyisocyanate having a functionality greater than 2, e.g., benzene-1,3,5-triisocyanate;
  (2) a polyol containing at least 3 OH groups capped with a di- or polyisocyanate;
  (3) an isocyanate-reactive crosslinking agent such as one having from 3 up to 6 or more reactive amine, hydroxy, thiol or carboxylate sites per average which can also be added to the water reactant or
  (4) a combination of (1) and (2).

Other examples of (a) operable to form particles with (b) would be (1) or (2) supra, per se, or blended together with or without (3).

When two or more isocyanate-capped polyols are blended to form (a), the ethylene oxide present in the polyol or blend of polyols can be present in only one polyol, some of the polyols or in each polyol as long as the amount is equal to at least 40 weight percent of the polyols present before capping with the di- or polyisocyanate.

In practicing the instant invention it is critical that the prepolymer be in droplet form when added to the water. If a stream of prepolymer is added, a foam material results. The size of the prepolymer droplet will depend on many variables including, but not limited to, the size of the opening, the viscosity of the prepolymer, the amount of pressure applied to the prepolymer and the surface tension of the prepolymer. The size of the droplet then determines the ultimate solid particle size formed on reaction with water. The opening may be larger or smaller than the ultimate droplet depending on the interaction of the above factors as is well konwn in the art. Generally speaking, the lower the viscosity, the smaller the ultimate solid particle size for a given opening; the smaller the opening, the smaller the particle size and the higher the pressure, the smaller the particle size. As a general rule, the diameter of the final solid particle is of the same order of magnitude as the droplet from which it is formed, i.e., 0.1–100 mils.

Herein, to show the particle is a solid, bulk density (the weight to volume relationship for solids) was measured. This term is also used in the prepolymer industry since the weight feed for example to an extruder in polymer processing must be related to the volume feed. See Kirk-Othmer, Encyclopedia of Chemical Technology, 3rd Edition, v. 10, pp. 198–203, incorporated herein by reference. The above mentioned bulk density is never as high as the density of a molded block or film prepared from the particles or pellets. That is, when particles are packed, there are voids in between the individual solid particles even if they are all exactly the same size and shape. In addition, there is a limit to the ability to pack to obtain the closest particle array based on varying size and shape of the particles. This means that bulk density will vary according to the shape and size distribution of the particles being packed. However as a general rule as shown in the Encyclopedia of Polymer Science and Technology, v. 14, pp. 349, 364, 376 and 377, incorporated herein by reference, the packing density, bulk density or apparent density is about 30–45% of the true density of the material. For example, polyvinyl chloride with a negligible amount of vinyl acetate as a comonomer in the system has a packing density of 0.52 and apparent density of 0.45. The density of polyvinyl chloride is in the range of 1.35 to 1.45 (1.40 g/ml average). The percentage of the real density is then 32% for the apparent density and 37% for the packing density. These apparent and packing densities are for solid particles.

In the instant application the true density of our isocyanate-capped prepolymer is 1.17 g/cc.

As will be shown in examples hereinafter wherein bulk or packing density was measured, the particles are solid particles when the bulk density is 30–45% of the true density. In addition an approximate method for obtaining the true density gives values about 1.1 g/cc, as described in the examples.

Another feature of the instant invention is that it is not necessary to emulsify the prepolymer in order to form solid particles by the process of this invention. Since the prepolymer is hydrophilic, it is miscible with water. Thus, with a hydrophilic prepolymer in water, two phases do not form; only the product of the water-hydrophilic prepolymer reaction gives the two separate phases.

The present crosslinked hydrophilic solids, discrete particles may be prepared by capping polyoxyethylene polyol with a polyisocyanate such that the capped product has a reaction functionality greater than 2. The capped product is formed into solid discrete particles simply by being added dropwise to and reacting with an agitated, aqueous reactant. Optionally, the capped product may contain a suitable crosslinking agent, if desired, in which case the capped polyoxyethylene polyol adduct may have a functionality approximating 2.

During capping, it is desirable that polyisocyanate be reacted with the polyol such that the reaction product, i.e., the capped product, is substantially void of reactive hydroxy groups while containing more than two reactive isocyanate sites per average molecule.

Polyoxyethylene polyol used as a reactant in preparing the capped product to be formed into solid particles by reaction with and addition to water may have a weight average molecular weight of about 200 to about 20,000, and preferably between about 600 to about 6,000, with a hydroxyl functionality of about 2 or greater, preferably from about 2 to about 8.

Polyoxyethylene glycol is terminated or capped by reaction with a polyisocyanate. The reaction is preferably carried out in an inert moisture-free atmosphere such as under a nitrogen blanket, at atmospheric pressure at a temperature in the range of from about 0° C. to about 120° C. for a period of time of up to about 80 hours depending upon the temperature and degree of agitation. This reaction may be effected also under atmospheric conditions provided the product is not exposed to excess moisture. The polyisocyanates used for capping the polyoxyethylene polyol include PAPI (a polyaryl polymethylene-polyisocyanate as defined in U.S. Pat. No. 2,683,730), tolylene diisocyanate, triphenylmethane-4,4′,4″-triisocyanate, benzene-1,3,5-triisocyanate, toluene-2,4,6-triisocyanate, diphenyl-2,4,4′-triisocyanate, hexamethylene diisocyanate, xylene diisocyanate, chlorophenylene diisocyanate, diphenylmethane-4,4′-diisocyanate, naphthalene-1,5-diisocyanate, 3,3′-dimethyl-4,4′-biphenylene diisocyanate, 3,3′-dimethoxy-4,4′-biphenylene diisocyanate, 2,2′,5,5′-tetramethyl-4,4′-biphenylene diisocyanate, 4,4′-methylene bis(phenylisocyanate), 4,4′-sulfonyl bis(phenylisocyanate), 4,4′-methylene di-orthotolylisocyanate, ethylene diisocyanate, trimethyl diisocyanate, dicyclohexyl methane-4,4′-diisocyanate, isophorone diisocyanate, 1,6-hexamethylene diisocyanate, 2,2,4-trimethyl-1,6-hexane diisocyanate and the like. Mixtures of any one or more of the above mentioned organic isocyanates may be used as desired. The aromatic diisocyanates, aliphatic and cycloaliphatic diisocyanates and polyisocyanates or mixtures thereof which are especially suitable are those which are readily commercially available, have a high degree of reactivity and a relatively low cost.

Capping of the polyoxyethylene polyol may be effected using stoichiometric amounts of reactants. Desirably, however, an excess of polyisocyanate is used to insure complete capping of the polyol. Thus, the ratio of isocyanate groups to the hydroxyl groups used for capping is between about 1 to about 4 isocynate to hydroxyl.

Isocyanate-capped polyoxyethylene polyol reaction products (prepolymers) employed in the present invention may be exemplified as follows. First, when water is the sole reactant with the isocyanate groups leading to chain growth during the solid particle forming process, the isocyanate-capped polyoxyethylene polyol reaction product must have an average isocyanate functionality greater than 2 and up to about 8 or more depending upon the composition of the polyol and capping agent components.

Secondly, when the isocyanate-capped polyoxyethylene polyol has an isocyanate functionality of only about 2, then a polyisocyanate crosslinking agent having an isocyanate functionality greater than 2 may be incorporated therein, and the resultant mixture may then be reacted with water or aqueous reactant, optionally containing a dissolved or dispersed reactive isocyanate-reactive crosslinking agent, leading to a crosslinked, hydrophilic polyurethane particle.

Several different modes may be used to prepare the prepolymer, i.e., the hydrophilic capped polyoxyethylene polyol reaction product having an average isocyanate functionality greater than 2. In forming the prepolymer, blends or mixtures of the various polyols and/or polyisocyanates may be used as desired so long as the total average isocyanate functionality of the final urethane containing reaction product is greater than 2.

One useful mode is to polymerize ethylene oxide in the presence of a polyfunctional hydroxyl containing starter component, such as glycerol, trimethylolpropane or trimethylolethane, which leads to polyoxyethylene triols. The molecular weight of these polymeric triols may be varied greatly, depending on the number of moles of ethylene oxide used in the reaction with the starter component. Starter components such as pentaerythritol and sucrose likewise treated with ethylene oxide lead to polymeric polyoxyethylene tetrols and octols, respectively. Alternatively, polyols suitable for capping with polyisocyanate may be prepared from diols, triols, tetrols, hexols and polycarboxylic acids.

A second possible method for preparing the prepolymer is by reacting polyoxyethylene glycol having a reactive functionality equal to 2 with a molar excess of a diisocyanate which leads to an isocyanate-capped polyurethane product (A) having an isocyanate functionality of two. A polyol such as pentaerythritol having a reactive functionality equal to 4 is reacted with a large molar excess of a diisocyanate to form an isocyanate-capped polyurethane intermediate product (B) having an isocyanate functionality of 4. By blending the two isocyanate-capped products thus prepared, i.e., products (A) and (B), in various molar proportions, the resulting product mixture has an average isocyanate functionality greater than 2 and on treatment with aqueous reactants will lead to new improved hydrophilic crosslinked polyurethane solid particles of the present invention. In addition, other monomeric or polymeric polyisocyanate crosslinking agents may be substituted for the tetraisocyanate product (B). Tolylene-2,4,6-triisocyanate having a reactive functionality of 3 is an example of a simple monomeric triisocyanate which may be usefully employed to achieve the same objective of imparting to the system an average isocyanate functionality greater than 2.

A third method for preparing the prepolymer is to blend a generally linear polyol, e.g., polyoxyethylene glycol with a polyol having at least 3 and preferably from 3 to 8 hydroxyl groups (e.g., trimethylolpropane, trimethylolethane, glycerol, pentaerythritol or sucrose). Generally, monomeric polyols having 3 or 4 hydroxyl groups per mole are employed. The blend is reacted with a sufficient amount of a polyisocyanate so that the resulting prepolymer blend has a functionality greater than 2 and is substantially void of unreacted hydroxyl groups, i.e., an excess of the polyisocyanate is preferably employed. The excess of polyisocyanate can range up to the point where about 4 isocyanate groups are employed for each hydroxyl group.

A fourth method would be to blend any combination of the prepolymer described in the first method with the constituents described in the second or third method either individually or collectively.

It has also been found that the capped polyoxyethylene polyol having an isocyanate functionality greater than 2 used to prepare a three-dimensional network polymer must be present in an amount sufficient to insure formation of the three-dimensional network. Thus, amounts of the capped polyoxyethylene polyol having an isocyanate functionality greater than 2 in the component to be formed into particles range from about 3% by weight of this component up to 100% by weight. Hence, it is possible to include a capped polyoxyethylene polyol having a terminal member with an isocyanate functionality of 2, i.e., a diisocyanate in an amount from 0% by weight up to about 97% by weight of the component to be formed into solid particles. The maximum amounts of diisocyanate used are limited to that necessary to permit crosslinking to take place during the particle forming reaction, as contrasted to formation of a linear polymeric structure.

The polyoxyethylene polyols used in this invention are water soluble reaction products derived from the polymerization of ethylene oxide in the presence of a polyfunctional starter compound such as water, ethylene glycol, glycerol, pentaerythritol, sucrose and the like. The molecular weights may be varied over a wide range by adjusting the relative ratios of ethylene oxide monomer to starter compound. The preferred molecular weight ranges have been described previously.

It is possible and sometimes desirable to incorporate various amounts of a relatively hydrophobic comonomer into the ethylene oxide based polymerization products. Thus, comonomers such as propylene oxide or butylene oxide may be copolymerized as a random copolymer, block-copolymer or both, such that the copolymers remain hydrophilic while having other desirable features for certain applications, namely, improved low temperature flexibility and hydrolytic stability. Up to about 40-60 weight percent, but desirably about 25-45 weight percent of the relatively hydrophobic comonomer, may be copolymerized with the ethylene oxide monomer and still yield hydrophilic crosslinked solid polyurethane particles when those products are used as polyol intermediates in practicing the present invention. Thus, throughout the text of this document, the term "polyoxyethylene polyol" is intended to include not only homopolymers of ethylene oxide but also hydrophilic copolymers of ethylene oxide such as those described above wherein all of these polyol derivatives have a hydroxyl functionality of about 2 or greater and an ethylene oxide content ranging from about 40 weight percent to about 100 weight percent and preferably greater than about 55 weight percent.

To effect solid particle formation and preparation of the crosslinked network polymer, the prepolymer or resin reactant is simply added dropwise to and reacted with water. For simplicity, this isocyanate-capped reaction component will occasionally be referred to herein as "resin reactant."

The aqueous component may be water, a water slurry or suspension or a water solution having water soluble materials disposed therein. For convenience, the aqueous component is referred to herein as an aqueous reactant.

In contrast to typical polyurethane reactions such as those using catalyst or like promoters where one mole of —NCO is reacted with one half mole water, the present reaction proceeds simply with large excesses of water with the prepolymer mixture added dropwise at controlled temperature to a water reservoir.

The reaction temperature to effect solid particle formation obviously is regulated by the viscosity of the resin reactant. The reaction may proceed either as a batch reaction or as a continuous reaction. The resin reactant must be added dropwise to the aqueous reactant with high volume ratios of water to prepolymer, at least 2:1. Obviously, the volume ratio of water reactant to prepolymer can be infinite, but for recovery purposes a water:prepolymer volume ratio in the range 2-200:1 is preferred. Lesser amounts of water than the amounts given in the volume ratio tend to lead to agglomeration of the individual particles and in some instances to foaming.

Because large amounts of water are in the aqueous reactant during reaction, i.e., the present invention is not dependent upon a stoichiometric molar NCO-water type reaction, it is possible to combine a great variety of materials in the aqueous reactant which are otherwise not possible with limited water reacting systems.

The aqueous reactant may be used at temperatures from slightly above 0° C. to about 100° C. as described. This temperature can be readily determined and can be modified by the use of catalysts in the aqueous phase. It is possible also to effect reaction of the resin reactant using water vapor to steam as the aqueous component.

When the prepolymer is added in drops, the agitation should be sufficient to sweep the formed particles from each drop out of the reaction zone prior to a successive drop contacting the agitated water reactant. That is, it is preferable to sweep the prepolymer out of the water entry zone before the next droplet appears. Agitation as low as 30 revolutions per minute is operable to form particles in the instant invention. As is well known to those skilled in the art, factors can be varied to control particle size such as rate of addition of prepolymer to the agitated water base and size of the liquid prepolymer droplet being added. Large amounts of many water soluble or water dispersible materials may be added to the aqueous reactant. These materials may be added to the aqueous reactant up to about 800% by weight of the amount of water in the aqueous reactant, depending, of course, on the particular material and its weight. Useful additives to the aqueous reactant include organic and inorganic salts, wax dispersions, flame retardants, fungicides, fillers, blowing agents, fibers, cellulosics, pigments, dyes, zeolites, nutrients, sorbents, chelates, hydrogenation or cracking catalysts, thickeners, stabilizers, promoters or the like. By homogeneously distributing these materials in the aqueous reactant, it is possible to effect wide distribution of these materials throughout the finally prepared particle. Some or all of the above additives may also be combined into the resin reactant, if desired.

Catalysts, antioxidants and other chemical reactants may be incorporated into the particles generated by practice of this invention. Such structures find effective use in a variety of chemical applications including catalytic reactions, fuel cells, water or blood purification, extraction applications, in separation systems and the like.

A wide variety of solid materials may be added to the present particles to produce changes in properties, particularly to improve final molding or coating characteristics. These solid materials which may be added include finely divided solid particles or powders, powdered metals, activated charcoal, carbon blacks, large granular or particulate solids and fibrous materials. Suitable fillers of this type include barium sulfate, alumina hydrate, zircon sand, calcium carbonate and the like and organic fillers.

Various conventional radiation barrier materials such as lead, boron hydrides, hafnium titanate and the like may also be combined with the present particles by way of the aqueous reactants.

The hydrophilic, crosslinked, polyurea-urethane, solid, discrete particles formed by the present invention may have average diameters in the range 0.1–100 mils.

The following examples will aid in explaining, but should not be deemed as limiting, the practice of the present invention. In all cases, unless otherwise noted, all parts and percentages are by weight.

EXAMPLE 1

A prepolymer was prepared by admixing 2 molar equivalents of polyethylene glycol having an average molecular weight of 1,000 (PEG—1,000) and one molar equivalent of trimethylolpropane (TMOP). The admixture was dried at 100°–110° C. under a pressure of 5–15 Torr to remove water. The resulting dried mixture was slowly added over a period of about one hour to a vessel containing 6.65 molar equivalents of toluene diisocyanate (TDI) while stirring the TDI and polyol mixture. The temperature was maintained at 60° C. The mixture was maintained at 60° C. with stirring for three additional hours. Then an additional 1.05 molar equivalent of TDI was added with stirring over a period of about one hour while maintaining the temperature at 60° C. The final reaction mixture contained a 10% molar excess of TDI. All hydroxyl groups were capped with isocyanate and some chain extension occurred due to both NCO groups on a TDI molecule reacting with OH groups on the diol. This prepolymer will be referred to herein as Prepolymer A.

EXAMPLE 2

A prepolymer was prepared as in Example 1 with the exception that 0.66 molar equivalents of TMOP were employed for every 2 molar equivalents of PEG—1,000. In the initial capping reaction with TDI, the amount of TDI employed was about 92% of that theoretically required to cap all hydroxyl groups in the polyol mixture. Subsequently, an additional 13% TDI was added to provide a theoretical molar excess of about 5%. This prepolymer will be referred to herein as Prepolymer B.

EXAMPLE 3

Example 2 was repeated except that no additional TDI was added to provide a theoretical molar excess. This prepolymer will be referred to as Prepolymer C.

EXAMPLE 4

4 g of Prepolymer A from Example 1 were warmed to 50° C. and added dropwise to a Waring blender containing 400 ml of water at 50° C. and being agitated at a speed of 2,100 rpm. The thus formed crosslinked polyurethane solid product was in the form of individual particles which were filtered free through No. 41 filter paper to give 4.0 g of solid discrete particles heavier than water. The dried particles had diameters ranging in size from 1 mil to 25 mils with the majority being fairly uniform in the 2–5 mil range. The particles were heated in water at 75° C. to show that they were crosslinked to the point of gellation. The filtrate was slightly turbid but the turbidity was removed by filtration through a No. 1 filter paper. The amount of product on the filter paper was too small to isolate. The particles when placed in a chamber at 100% humidity for 3 days increased in weight by 34% indicating the polymer particles were hydrophilic.

EXAMPLE 5

Pinpoint size holes, about 20 mils, were punched in the bottom of a 16 oz. papercup and to this was added 22 g of Prepolymer A from Example 1 which had been warmed to 50° C. The prepolymer exited through the holes in the papercup into a Waring blender containing 500 ml of water at 45° C. and being agitated at a speed of 2,100 rpm. The thus produced solid polyurea-urethane wet particles after drying in an oven weighed 12.3 g. The particle diameter ranged from 2 mils to 50 mils with the majority of the particles in the 2–5 mil range. These particles were heavier than water. The particle when placed in a chamber at 100% humidity for 3 days increased in weight by 40% indicating the polymer particles were hydrophilic.

EXAMPLE 6

20 g of Prepolymer A from Example 1 were passed through pinholes in the bottom of an aluminum cup into 300 ml of a 50/50 water-propylene glycol bath being agitated by a magnetic stirrer at 60 rpm. 4.85 g of very fine size solid, crosslinked polyurethane particles were obtained after filtration.

EXAMPLE 7

20 g of Prepolymer A from Example 1 were dipped into a Waring blender containing 400 ml of water being stirred at high agitation. After stirring for a few minutes, the solid, crosslinked polyurea-urethane particle product was filtered wet through sieves to give the following screen classification by weight:

| Average Particle Diameter Mils | Weight Percent |
|---|---|
| less than 11 | 23.0 |
| 11–16 | 37.1 |
| 16–33 | 39.9 |

EXAMPLE 8

Prepolymer B from Example 2 was preheated in an oven at 45° C. and then added to a 16 oz. cup having holes of approximately 50 mils in diameter in the bottom. The prepolymer was allowed to drip through the holes into one liter of water at 45° C. in a Waring blender being stirred at 2,100 rpm. Small, discrete, solid, crosslinked polyurea-urethane particles were formed which were readily filtered. The particles were dried in a vacuum oven at 50° C. and about 150 Torr to give 30.2 g of particulate material having an average diameter in the range 5–40 mils. The particles were heavier than water and had a bulk density of 0.31 g/cc. The particle when placed in a chamber at 100% humidity for 3 days increased in weight by 47% indicating the polymer particles were hydrophilic.

EXAMPLE 9

Prepolymer C from Example 3 was preheated in an oven at 45° C. and then added to a 16 oz. cup having holes in the bottom thereof of about 50 mils in diameter. The prepolymer was allowed to drip through the holes into a Waring blender containing 500 ml of water heated to 45° C. The blender was agitated at 2,100 rpm. The solid crosslinked polyurea-urethane particulate product was filtered and dried in a vacuuum oven at 50° C. and 150 Torr to give 50.0 g of particulate material. The particles ranged from 10–50 mils in diameter. The particle when placed in a chamber at 100% humidity for 3days increased in weight by 55% indicating the polymer particles were hydrophilic.

EXAMPLE 10

A mixture of 2000 g (2.0 moles) of polyethylene glycol having a molecular weight of 1,000 and 425 g (1.0 mole) of an oxyethylene-oxypropylene triol commercially available from BASF Wyandotte under the tradename "Pluracol TP-440" was dried at 105° C. and 1.5 Torr for 7 hours. The dried mixture was added at 60° C. to 1,218 g (7.0 moles) of toluene diisocyanate over a 2 hour period. Heating at 60° C. was continued for an additional 5.75 hours. The resultant prepolymer will be referred to hereinafter as Prepolymer D.

Prepolymer D at 25° C. was added to a 16 oz. cup having holes of approximately 50 mils in diameter in the bottom. The prepolymer was allowed to drip through the holes into 500 ml of water at 45° C. in a Waring blender being stirred at 2,100 rpm. Small, discrete, solid, crosslinked polyurea-urethane particles formed readily during the 30 minute addition period. The particles were readily filtered and dried to a fine white powder (12.3 g) in a vacuum oven at 50° C. and about 150 Torr. The particles had an average diameter in the range of 1–10 mils and were heavier than water.

EXAMPLE 11

A mixture of 2,000 g (2.0 moles) of polyethylene glycol having a molecular weight of 1,000, 134 g (1.0 mole) of trimethylolpropane and 1,485 g (0.5 mole) of an oxyethylene-oxypropylene triol having secondary hydroxyl groups and being commercially available under the tradename "Voranol-3010" from Dow Chemical Co. was heated to 105° C. at 0.1 Torr for 5¼ hours. The mixture was then added to 1,157.1 g (6.65 moles) of toluene diisocyanate (78% theory) containing 2 drops benzoyl chloride and 3 drops of stannous octoate catalyst at 60° C. over a 3 hour period. The reaction was continued at 60° C. for an additional 4 hours. 2,388 g (50% of the resultant product) was added to 453.7 g of toluene diisocyanate containing 2 drops of benzoyl chloride and 3 drops of stannous octoate catalyst over a 1 hour period. The reaction was heated to 60° C. and continued for 7 hours. The resultant product had a viscosity of 32,000 centipoises. The NCO content was 2.53 meq/g. This prepolymer will be hereinafter referred to as Prepolymer E.

Prepolymer E was preheated in an oven to 40° C. and added to a 16 oz. cup having holes of approximately 50 mils in diameter in the bottom. The prepolymer was allowed to drip through the holes into 500 ml of water at 45° C. in a Waring blender being stirred at 2,100 rpm. The discrete, solid, crosslinked polyurea-urethane particles were readily filtered. The dried particles weighed 10.7 g, had an average diameter in the range 5–50 mils and were heavier than water.

EXAMPLE 12

To 57.5 g (0.33 mole) of toluene diisocyanate there was added over a ten-minute period 500 g (0.1048 mole) of a triol containing about 80% oxyethylene units and about 20% oxypropylene units, having a molecular weight of 3000 and commercially available from Dow Chemical Company. The reaction was continued for 4½ hours at 60° C. at which time ten drops of stannous octoate and 10 additional grams of toluene diisocyanate were slowly added to the reaction. The reaction was continued for an additional 70 hours at 60° C. The thus formed prepolymer will hereinafter be referred to as prepolymer F.

Prepolymer F was warmed to 50° C. and added to a 16 oz. cup having holes in the range 50–75 mils in diameter in the bottom. The prepolymer was allowed to drip through the holes into 500 ml of water at 50° C. in a Waring blender being stirred at 2,100 rpm. Very fine, solid, discrete, hydrophilic crosslinked polyurea-urethane particles resulted.

EXAMPLE 13

Solid, crosslinked hydrophilic polyurethane particles from Example 12 were placed on a wooden tongue depressor (6"×1"). The depressor was then placed between Teflon fiberglass ("Fluoroglass") sheeting and aluminum foil, all of which were placed on a Pasadena platen press (12"×12"). The lower platen was heated to 280° F. and the upper platen to 240° F. The system was preheated for 1 minute and then pressed at hydraulic pressure of 10,000 pounds for 5 minutes. The particles formed an adherent continuous coating on the tongue depressor.

EXAMPLE 14

2 Weirchrome steel coupons (3"×1") were placed on top of each other with about 0.1 g of the particles from Example 12 between the 2 coupons. The thus formed sandwich was placed in a Pasadena platen press with the lower platen at a temperature of 300° F. and the upper platen at a temperature of 280° F. After one minute the sandwich was pressed at 10,000 pounds for 5 minutes. On removal from the platen press the Weirchrome steel coupons were adhered together.

EXAMPLE 15

A Weirchrome steel coupon and a tongue depressor were placed together with about 0.1 g of particles from Example 13 between the coupon and the depressor. The sandwich was placed on a Pasadena platen press whose lower platen was at a temperature of 300° F. and whose upper platen temperature was at a temperature of 280° F. After 1 minute the sandwich was pressed at 10,000 pounds for 5 minutes. Upon removal the steel coupon adhered to the wood.

EXAMPLE 16

Example 15 was repeated except that particles from Example 8 were used as the adhesive between the coupon and the wooden tongue depressor. Upon removal from the platen press the coupon adhered to the wooden tongue depressor.

EXAMPLE 17

Example 13 was repeated except that a Weirchrome steel coupon was used in place of the wooden tongue depressor. An adherent continuous coating was formed on the coupon.

EXAMPLE 18

Solid, crosslinked, hydrophilic polyurea-urethane particles from Example 5 were placed on a Weirchrome steel coupon (3"×1"). The coupon was then placed between Teflon fiberglass ("Fluorglass") sheeting and aluminum foil, all of which were placed on a Pasadena platen press. The lower platen was heated to 310° F. and the upper platen to 280° F. The system was preheated for 1 minute and then pressed at 20,000 pounds for 8 minutes. The particles formed an adherent translucent continuous film coating on the coupon.

EXAMPLE 19

A mixture of 232 g (0.055 moles) of a diol grafted with 10-15% by weight of styrene/acrylonitrile commercially available from Union Carbide under the tradename "NIAX Polyol 34-28", 1,000 g (1.00 mole) of polyethylene glycol having a molecular weight of 1,000 and 81.7 g (0.61 mole) of trimethylolpropane was heated for 7 hours at 105° C. and 1.5 Torr. The dry mixture was added to 650.8 g (3.74 moles and 95% theory) of toluene diisocyanate at 60° C. over a 45 minute period and then heated for 4 hours at 60° C. with stirring. The resultant prepolymer was added to 93.4 g (0.394 mole) of toluene diisocyanate over a 45 minute period at 60° C. and heated for an additional 7.25 hours at 60° C. (105% of theory TDI). The resultant prepolymer will hereinafter be referred to as Prepolymer G.

Approximately 20 g of Prepolymer G were preheated in an oven at 50° C. and then added to a 16 oz. papercup having holes of approximately 25 mils in diameter in the bottom. The prepolymer was allowed to drip through the holes into 500 ml of water at 4,5° C. in a Waring blender being stirred at 2,100 rpm. The hydrophilic, crosslinked polyurea-urethane particles formed were filtered, dried in a vacuum oven at 50° C. and about 150 Torr. The particles weighed 2.5 g.

The polyurea-urethane particles of the instant invention can be used to coat various substrates including, but are not limited to, plastic, wood, metal, e.g., aluminum, steel and copper, brick, ceramic, glass, cloth, fabric, fibrous webs and other porous substrates, floor tiles and the like. Other uses include, but are not limited to, adhesives, caulks, elastomeric sealants and the like.

In the following examples varying amounts of Prepolymer A from Example 1 at a temperature of 55°-60° C. were added as either a stream or dropwise to various amounts of water being agitated at 4,000 rpm in a one liter Waring blender. The approximate true density of particles formed was measured as follows:

A 25 ml graduate was used and the weight of bromobenzene to fill to the 25 ml mark was determined. Knowing the density of bromobenzene, the actual volume of the graduate was determined. To the same, clean, dry graduate (tared) was added as many of the hydrophilic particles as possible and then weighed. Bromobenzene was added to the 25 ml mark and weighed. The volume of bromobenzene and of the particles was determined. The weight of the particles divided by the volume of particles was used to give the density. The thin stream foam could not be separated to insert into the graduate. Thus, no density could be obtained. The results are shown in TABLE I:

TABLE I

| Example No. | Method of Addition | H₂O ozs. | Prepolymer A ozs. | Form of Product | Wt. g | Density of Particles g/cc Bulk | True |
|---|---|---|---|---|---|---|---|
| 20 | Thin stream | 8 | about 2 | Foam only | 29 | Could not determine; no individual particles | Not measurable |
| 21 | Styrofoam cup with 40 mil holes punched in | 8 | about 2 | 95% particles; 5% foam but not particulate | 66 | 0.464 | 1.13 |
| 22 | Styrofoam cup with 20 mil holes | 8 | about 2 | 90% particles | 63 | 0.423 | 1.12 |

TABLE I-continued

| Example No. | Method of Addition | H₂O ozs. | Prepolymer A ozs. | Form of Product | Wt. g | Density of Particles g/cc Bulk | True |
|---|---|---|---|---|---|---|---|
| | punched in | | | | | | |

We claim:

1. A process for forming solid, discrete, hydrophilic, crosslinked polyurea-urethane particles having an average diameter in the range 0.1–100 mils consisting of adding a droplet form and in the absence of an emulsifying agent
    (a) a hydrophilic prepolymer comprising an isocyanate-capped polyol or mixtures thereof wherein said polyol or mixture of polyol has a reaction functionality greater than two, the total of said polyol present having an ethylene oxide content of at least 40 weight percent before capping, to
    (b) an agitated water reactant, the volume ratio of (b):(a) being at least 2:1 and thereafter recovering the thus formed polyurea-urethane particles therefrom.

2. The process according to claim 1 wherein at least one of the polyols is a polyoxyethylene polyol having a molecular weight in the range 200–20,000.

3. The process according to claim 2 wherein the molecular weight is in the range 600–6,000.

* * * * *